May 30, 1950 E. L. TORNQUIST 2,509,708

FILM DEVELOPING REEL

Filed Oct. 19, 1946

INVENTOR.
Earl L. Tornquist,
BY
Brown Jackson Boettcher Dienner
Attys.

Patented May 30, 1950 2,509,708

UNITED STATES PATENT OFFICE 2,509,708

FILM DEVELOPING REEL

Earl L. Tornquist, Elmhurst, Ill., assignor of one-half to John A. Dienner, Evanston, Ill.

Application October 19, 1946, Serial No. 704,488

6 Claims. (Cl. 95—90.5)

My invention relates generally to a reel or holder for photographic film and more particularly to a reel employed in developing film.

Reels for the development of photographic film have been proposed wherein the reel heads have spiral grooves in their inner faces which are opposed to each other. Such reels are difficult to load, however, since the film may only be handled from a point outside the perimeter of the reel by pushing upon the flexible film outside the reel. It is an object of my invention to provide a reel having spiral slots cut completely through each reel head and in register with one another whereby the outer edges of the film which has entered the reel may be gripped by pressure upon the edges. In the accomplishment of this object I provide means for bridging the spiral slot, which bridging means in the preferred form extends radially across the slots of each reel head, one such bridge beginning at the junction of the spiral slot with the perimeter of the head.

If the spiral slots are of sufficient width the thumb and a finger of one hand pressed against opposed slots on the outer side of the reel heads will permit the operator to grip the edges of the film and to direct it inwardly or outwardly of the reel. Preferably, however, I provide flexible reel heads which are adapted to be pressed toward each other whereby the edges of the film will project from the slots and may be readily gripped between the thumb and finger of a hand. As an alternative to such structure I may form the bridging means so that it arches over each slot with the distance between the inner surface of the opposed arches being substantially equal to the width of the film while the distance between the outer sides of the head adjacent their slots is less than the width of the film. In such construction the film will always have its edges projecting slightly from the slots of the heads while yet being restrained against lateral displacement by the arched bridging means. Both actions may be built into the same structure.

A further advantage to providing heads with spiral slots which are cut through the heads is that chemical solutions may be directed to the surfaces of the film more quickly than in prior devices when the reel is subjected to a developing bath.

My reel is adapted to handle both "color" film and "black and white" film of the usual form which is subjected to developing bath or baths and subsequent washing operations. A form of color film presently on the market requires, in addition to the normal developing bath, an intermediate step wherein the film is exposed to light after being subjected to chemical solutions, and then is subjected to further chemical treatment. With the conventional type of reel it is necessary to remove this type of film, which has become wet, from the reel so that it may be exposed to the light and then to return the film to the reel for further bathing operations. However, once the film becomes wet it becomes limp and has a tendency to curl and is very difficult to reload into the reel.

It is another object of my invention to provide a reel which is formed of transparent material such as a clear plastic material, for example, so that film which requires it may be left in the reel for exposure to light between bathing operations. So that the length of such exposure may be reduced, the center support or hub of the reel is given a coating of light reflecting material on that side which is adjacent the film. Where the reel is retained in a developing receptacle and the light is directed through one head onto the film, the opposite head may be coated with a light reflecting material also. The side walls and bottom of the receptacle in which the reel may be retained should in such case also be provided with a light reflecting surface.

It is preferable to space the distance between the spirals at a greater distance than in the conventional type of reel so that sufficient light will reach the film without an excessively long exposure. To assist in reducing the time needed for exposure to light during the developing operation, I form one or both of the heads in such a manner as to diffuse or to direct the light which shines on the reel heads. Diffusion of the light may be produced by "frosting," or the like, and direction of the light may be produced by so shaping the surface of the reel hads as to "refract" the light on to the surface of the film. This may be done, for example, by forming the upper and lower surfaces of the heads between the convolutions of the spiral slots in a manner to provide a prism-like structure or structures which will bend the rays of light toward the surfaces of the film.

Further objects, advantages and uses of my invention will become apparent from the following written description and the related drawings in which.

Figure 1:
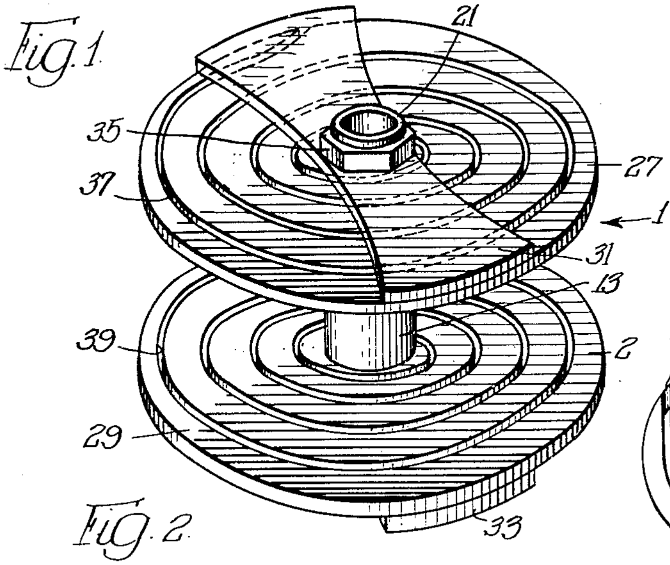
Figure 1 is a perspective view of a reel embodying my invention.
Figure 2:
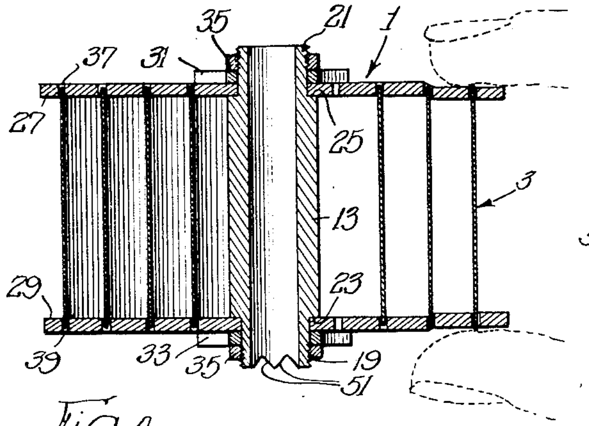
Figure 2 is a vertical, sectional view of the reel of Figure 1 with a camera film inserted therein.
Figure 3:
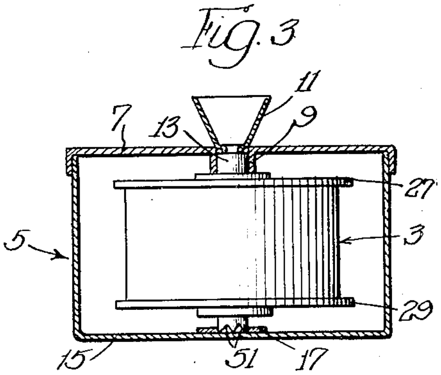
Figure 3 is a view on reduced scale showing a reel similar to that of Figure 1 with a film wound thereon, the reel and film being positioned in a developing tank.

Referring now to Figures 1, 2 and 3 the reel embodying my invention is indicated generally by the reference numeral 1 while the camera film wound thereon is indicated generally by the reference numeral 3. In the course of the development of the film 3 it will be subjected to one or more developing baths and rinses and therefore must be placed in some tank or other receptacle. In Figure 3 there is diagrammatically shown a tank 5 which has a light proof cover 7 with a central, downwardly extending tubular portion 9, which fits over the end of the hollow hub or stem 13 of reel 1 and which serves to support a funnel 11, the neck of which extends into the hollow hub 13. The lower portion 15 of the tank 5 may have an integral recessed disk 17 in which the end 19 of hub 13 is adapted to seat. The manner in which the film 3 is subjected to various treatments during its developing will be discussed more fully hereinafter.

Referring more particularly now to Figures 1 and 2 it will be seen that the hollow hub or stem 13 of the reel 1 has a central portion and two reduced ends 19 and 21. At the junction of the central portion of the hub with the reduced ends shoulders 23 and 25 are formed and reel heads 27 and 29, respectively, are seated on the shoulders and about the reduced ends. Outwardly of each reel head there is postioned a diametrically extending bridge member such as the members 31 and 33 for the heads 27 and 29, respectively. Each bridge member is permanently secured to its corresponding reel head and said member and head are held against one of the shoulders on the hub 13 by a nut 35 which is threaded on to one of the reduced threaded ends of the hub. It will be understood that other means for securing the reel heads against the shoulders on the hub may be used.

The heads 27 and 29 of the reel 1 each have a spiral slot cut through the head and extending from the perimeter toward the hub. The slot 37 of head 27 and the slot 39 of head 29 are substantially identical and are positioned opposite one another in parallel relation. The junctions of the slots with their respective perimeters are positioned exactly opposite one another so that film may readily be inserted in the slots and fed into the reel. It will be noted that the bridge for each reel head tends to maintain the head in a single plane and bridges the succeeding turns of the slot at the intersection of said bridge and slot. In the preferred form of my invention the birdge has one end at the intersection of the slot with the perimeter of the reel head as shown in Figure 1, which serves not only to strengthen the reel head but also to guide the camera film into the reel. The bridges also prevent lateral displacement of the film from the reel through the slots in the reel heads.

In the preferred form of my invention the distance between the outer surfaces of the reel heads is substantially equal to the width of the film and I make the reel heads flexible so that the user may squeeze the heads toward each other, between a thumb and finger, for example, whereby the film will project through the slot and may be gripped by said thumb and finger and be guided through the slots in the reel heads. It will be understood of course that if the spiral slots in the heads are sufficiently wide the heads need not be flexible since the pressure of a thumb and finger on the outer surface of the heads will cause the pads of the thumb and finger to extend into the slot and into engagement with the edges of the film, whereupon the film may be guided through the slots and into the reel. In each form the slots in the reel heads may be outwardly beveled to make easier the gripping of the edges of the film.

Figure 4:
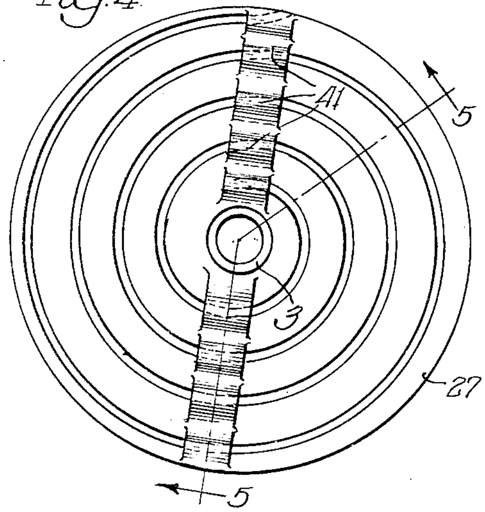
Figure 4 is a plan view of a modified form of reel.
Figure 5:
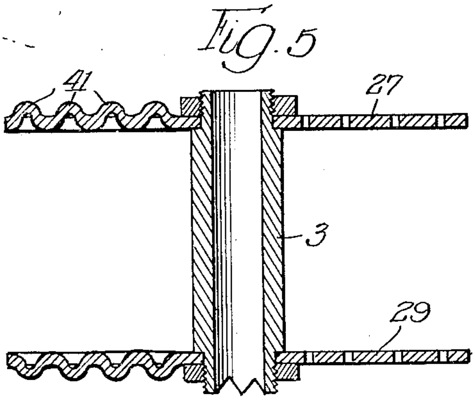
Figure 5 is a vertical section of the reel of Figure 4 taken on the line 5—5 of Figure 4.

A modification of my invention is shown in Figures 4 and 5 wherein the bridging members for the reel heads 27 and 29 comprise a series of integral arches 41 over the slots in each reel head. These arches 41 preferably are formed integrally with the head but may be formed as part of a corrugated strip or strips which are then secured to the head on either side of the hub 13. As in the device of Figures 1 and 2, the bridging means includes an arch at the intersection of the slot with the perimeter of each head.

In the form of my invention disclosed in Figures 4 and 5 the distance between the inner surface of the arches 41 on opposite heads is substantially equal to the width of the camera film which is wound thereon while the distance between the outer surfaces of the heads adjacent their slots is less than the width of the film. This means that the edges of the film extend beyond the outer surface of each head a slight amount at all times so that the film is readily gripped between a thumb and finger for guidance through the reel.

Figure 6:
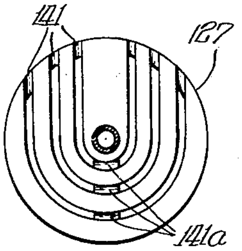
Figure 6 is a cross sectional view on reduced scale of another type of reel or film holder. Like reference numerals have been employed in the several views to indicate the same elements.

In Figure 6 a modified form of reel is shown in which the head 127 has a series of parallel slots 139 into which slots may be inserted pieces of cut film instead of a roll of film. In this form of reel the bridge portion may consist, for example, of arched sections 141 where the slots 139 intersect the perimeter of the head and a series of arched sections 141*a* substantially equidistantly spaced from the arched portions 141.

In all of the forms of reel illustrated and described I may provide a hub which is adjustable so as to accommodate films of different width. This may be done in any one of a number of known manners. One satisfactory manner of providing such a hub, for example, would be to extend outwardly the reduced end 21 of the hub 13 (Figures 1 and 2). This extension would be threaded so that the user could take off the nut 35 and head 27 and slip one or more sleeves, having an inner diameter corresponding to the diameter of end 21, on to the end 21 and into abutment with the shoulder 25 on the hub, whereupon the head 27 would be replaced and the nut 35 threaded on to end 21 to hold the head in place. If it were desired to accommodate films of lesser width than that illustrated in Figures 1 and 2, the thickened central portion of hub 13 would be reduced axially and threaded an appropriate distance. Sleeves would then be supplied to accommodate films of greater width in the manner set forth above.

In the normal development of black and white film the roll of film will be introduced to the slots 37 and 39 of the reel 1 and fed into said reel. Thereafter the reel will be inserted into a tank such as tank 5 of Figure 3, whereupon the light proof lid 7 will be placed over said tank and reel and the funnel will, at that time, be inserted into the hollow hub 13 of the reel 1. The foregoing operations are generally carried out in a "dark room." A chemical solution referred to as "developer" is poured into the funnel 11 and feeds through the hollow hub 13 of the reel to its reduced end 19 and then passes upwardly from the hub 13 through the notches 51 at the lower end 19 of the reel. As the developer continues to be poured in, it rises in the tank 5 and passes through the slot 39 and then upwardly past the surfaces of the film and through the slot 37 at the top of the reel 1. After the film has been subjected to the developer for the proper length of time the developer is drained or poured off from the tank 5 and the tank is then filled either with a washing solution or what is referred to as a "short stop" solution containing acetic acid which stops further developing action. The washing solution or short stop solution is subsequently removed from the tank and the film is subjected to another chemical solution known as a "hypo." Further steps in accordance with the instructions of the manufacturer of the film will subsequently be taken to properly develop it.

In the case of a type of colored film presently on the market the developing procedure is somewhat different. The film is first introduced to the reel 1, the reel is then placed in the tank 5, the lid 7 secured thereover and the "developer" is then poured into the tank, these operations generally being performed in a "dark room" as explained above. After the developer has been employed for the proper period of time it is removed and a "short stop" solution is substituted, whereupon the film may be subjected to light without danger of damaging the film. Then a washing step is employed. Thereafter it is necessary to re-expose the film to light a certain length of time to properly develop it. After this re-exposure the film is subjected to further developing steps in the tank 5. Reels presently on the market are opaque to the extent that it has been necessary to remove the reel from the tank and to remove the wet film from the reel before re-exposing it to light. Then it has been necessary to return the film to the reel for further developing steps. Since the wet film is limp and tends to curl it is extremely difficult at such time to feed it into the reel.

In the preferred form of my invention the reel 1 is formed of transparent material, such as glass or clear plastic, for example, so that it is unnecessary to remove the film from the reel during the re-exposure step. Furthermore, this step may be taken with the reel still in the tank, the solution having been removed therefrom. In order to reduce the length of time necessary for re-exposing the film in the tank 5, I form the hub 13 of the reel with a light reflecting surface on that side of the hub which is adjacent the film and I may form a light reflecting surface on the inner or outer side of the lower reel head 29, so that a maximum amount of light will be transmitted to the surfaces of the film. It is also desirable to provide the interior surface of the tank with a light reflecting surface to further disperse the light so that the re-exposure time is not unduly extended.

When the reel is to be used for re-exposure of the film as above described, I have found it desirable to space the succeeding coils or turns of the slots at a greater distance than normal to permit the light to get to the surfaces of the film more readily. In addition, the surfaces of the reel heads 27 and 29 may be so formed optically as to additionally disperse the light which passes therethrough.

While I have shown a preferred embodiment of my invention I do not intend to be limited thereto, except insofar as the appended claims are so limited, since certain changes may be made therein without departing from the scope of my invention as defined in the following claims.

I claim:

1. A reel for developing film comprising a pair of spaced apart reel heads, each head having a spiral slot therethrough for guiding the film into the reel and for permitting passage of fluid over the surfaces of the film in the reel, means for bridging the slots in said heads, the lateral distances between portions of the inner surfaces of said bridging means being substantially equal to the width of the film, and the distance between the outer surfaces of said reel heads adjacent their slots being less than the width of said film.

2. A reel for developing film comprising a pair of spaced apart reels heads, each head having a spiral slot therethrough for guiding the film into the reel, means bridging the slots in said heads, the lateral distance between portions of the inner surfaces of said bridging means being substantially equal to the width of the film, said heads being flexible to positions where the film projects from the slots so that the edges of the film may be gripped.

3. A reel for developing film comprising a pair of spaced apart reel heads, each head having a spiral slot therethrough for guiding the film into the reel and for permitting passage of fluid over the surfaces of the film in the reel, said heads being flexible toward each other, and means for bridging the slots in said heads, the lateral distances between portions of the inner surfaces of said bridging means being substantially equal to the width of the film, and the distance between the outer surfaces of said reel heads adjacent their slots being less than the width of said film.

4. A reel for developing film comprising a pair of spaced apart reel heads, each head having a spiral slot therethrough for guiding the film into the reel, and means for bridging the succeeding convolutions of the slots, said bridging means being substantially flush with the peripheries of the heads and bridging the slots where the slots intersect the peripheries of the heads.

5. A reel for developing film, which film is adapted to be subjected during development to baths and to an intermediate step wherein the film is exposed to light, said reel comprising a pair of spaced apart reel heads, at least one of which is adapted to transmit light and both of which have a spiral slot therethrough for guiding the film into the reel and for permitting the passage of fluid over the surfaces of the film in the reel, the cross sections of those portions of each head which space apart successive convolutions of the slot being of such shape as to have major and minor axes, and means preventing lateral displacement of the film relative to the heads.

6. A reel for developing film, which film is adapted to be subjected during development to baths and to an intermediate step wherein the film is exposed to light, said reel comprising a pair of spaced apart reel heads, at least one of which is adapted to transmit light and both of which have a spiral slot therethrough for guiding the film into the reel and for permitting the passage of fluid over the surfaces of the film in the reel, the cross sections of those portions of each head which space apart successive convolutions of the slot being of such shape as to have major and minor axes, with the major axes of each of the cross sections lying generally parallel to the plane of its head and the spacing portions of the head serving to space apart the succeeding convolutions of its slot a substantial amount, whereby a substantial amount of light may be transmitted to the film through the light transmitting head while the film is in the reel, and means preventing lateral displacement of the film relative to the heads.

EARL L. TORNQUIST.

REFERENCES CITED

The following references are of record in the file of this patent:

UNITED STATES PATENTS

| Number | Name | Date |
|---|---|---|
| 1,140,500 | Corey | May 25, 1915 |
| 1,212,498 | Kelsay | Jan. 16, 1917 |
| 2,073,978 | Smith | Mar. 16, 1937 |
| 2,187,948 | Moore | Jan. 23, 1940 |
| 2,248,179 | Miller | July 8, 1941 |

FOREIGN PATENTS

| Number | Country | Date |
|---|---|---|
| 502,780 | Germany | July 3, 1930 |
| 600,567 | Germany | July 25, 1934 |